United States Patent
Fujita

(10) Patent No.: US 12,030,361 B2
(45) Date of Patent: Jul. 9, 2024

(54) VEHICLE REAR SUSPENSION STRUCTURE

(71) Applicant: SUZUKI MOTOR CORPORATION, Hamamatsu (JP)

(72) Inventor: Masafumi Fujita, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 13 days.

(21) Appl. No.: 18/093,489

(22) Filed: Jan. 5, 2023

(65) Prior Publication Data
US 2023/0256790 A1    Aug. 17, 2023

(30) Foreign Application Priority Data
Feb. 15, 2022    (JP) .................................. 2022-021339

(51) Int. Cl.
*B60G 21/05*    (2006.01)
(52) U.S. Cl.
CPC ........ *B60G 21/051* (2013.01); *B60G 2200/21* (2013.01); *B60G 2206/20* (2013.01)
(58) Field of Classification Search
CPC .............. B60G 21/051; B60G 2200/21; B60G 2206/20
USPC .................................................. 280/124.128
See application file for complete search history.

(56) References Cited

U.S. PATENT DOCUMENTS

| | | | |
|---|---|---|---|
| 7,914,019 B2 * | 3/2011 | Jakob ................... | B60G 21/051 280/124.125 |
| 8,220,810 B2 * | 7/2012 | Jakob .................... | B60G 7/008 280/124.128 |
| 8,342,547 B2 * | 1/2013 | Gerrard ................. | B60G 7/008 280/124.128 |
| 2007/0052192 A1 * | 3/2007 | Kawanobe ............. | B60G 7/008 280/124.13 |
| 2012/0013095 A1 * | 1/2012 | Gerrard ................. | B60G 7/008 280/124.134 |
| 2021/0008949 A1 * | 1/2021 | Takahashi .............. | B60G 7/001 |

FOREIGN PATENT DOCUMENTS

| CN | 114633595 A * | 6/2022 | .......... B60G 21/051 |
|---|---|---|---|
| JP | 2020128195 A | 8/2020 | |
| WO | WO-2012102389 A1 * | 8/2012 | .......... B60G 21/051 |

* cited by examiner

*Primary Examiner* — Toan C To
(74) *Attorney, Agent, or Firm* — TROUTMAN PEPPER HAMILTON SANDERS LLP

(57) ABSTRACT

A vehicle rear suspension structure includes a torsion beam and a pair of arm units. Each of the arm units includes a trailing arm formed in a tubular shape extending in the vehicle front-rear direction, an end plate occluding a rear side opening of the trailing arm, an upper reinforcing member, and a lower reinforcing member. A shaft insertion hole is formed in an inner side portion of a rear arm of the trailing arm, the upper reinforcing member is joined to the rear arm to fit an upper side edge portion of a peripheral edge portion of the shaft insertion hole, and the lower reinforcing member is joined to the rear arm to fit a lower side edge portion of the peripheral edge portion of the shaft insertion hole.

5 Claims, 9 Drawing Sheets

VEHICLE REAR SUSPENSION STRUCTURE

CROSS REFERENCE TO RELATED APPLICATION

The present application claims priority of Japanese Patent Application No. 2022-021339 filed Feb. 15, 2022. The entire contents of which are hereby incorporated by reference.

TECHNICAL FIELD

The present invention relates to a vehicle rear suspension structure.

BACKGROUND

As an example of a rear suspension structure that may be widely used as a suspension structure for rear wheels in a 4WD vehicle (four-wheel drive vehicle) having an internal combustion engine as a drive source, a suspension structure disclosed in JP 2020-128195 A is known. The suspension structure disclosed in JP 2020-128195 A is provided with: a torsion beam extending in a vehicle width direction; a left trailing arm connected to a left end of the torsion beam; a right trailing arm connected to a right end of the torsion beam; a left carrier bracket attached to an upper portion of the left trailing arm; and a right carrier bracket attached to an upper portion of the right trailing arm. A rear wheel hub is attached to each carrier bracket, and a drive shaft is connected to the hub.

In a 4WD vehicle, the driving force from an engine arranged on a front side of the vehicle is transmitted to rear wheels via a propeller shaft extending in the vehicle front-rear direction and a drive shaft extending in the vehicle width direction. The propeller shaft is arranged to pass over the torsion beam in order to avoid interference with the torsion beam. Consequently, the drive shaft is also arranged above the torsion beam, and the carrier bracket to which the hub is attached is also attached to the upper portion of the trailing arm as described above. As such, in the conventional rear suspension structure for the 4WD vehicle, positions of the constituent elements are subjected to restriction by the propeller shaft.

On the other hand, most engine-driven vehicles are 2WD (two-wheel drive) vehicles that drive only two wheels, and most 2WD vehicles employ a mode of driving only the front wheels by means of an engine arranged at a front side of a vehicle. A rear suspension structure in such a 2WD vehicle (that is, an FF (front-engine, front-wheel-drive) vehicle) is not subjected to the restriction by the propeller shaft. Consequently, in the 2WD vehicle (FF vehicle), the hub is often attached to an end plate joined to the trailing arm so as to occlude a rear side opening of the tubular trailing arm. As described above, a rear suspension structure of such a type that the end plate is joined to the trailing arm so as to occlude the rear side opening of the trailing arm (hereinafter referred to as an end plate-type structure as appropriate) is widely employed for the 2WD vehicles (FF vehicles).

SUMMARY

Incidentally, in recent years, with the shift of vehicles to electric vehicles, a technology of driving rear wheels by an electric motor instead of an engine has also been employed for the 4WD vehicle. In the case of the motor-driven 4WD vehicle, the electric motor driving the rear wheels is arranged on a rear side of the vehicle, unlike the engine-driven 4WD vehicle. Therefore, in the motor-driven 4WD vehicle, the propeller shaft is no longer necessary and the rear suspension structure thereof is not subjected to the restriction by the propeller shaft.

Given this, construction of a novel structure to be applied to a rear suspension structure in a 4WD vehicle in which an electric motor drives rear wheels is desired. However, from the viewpoint of cost and the like, construction of a rear suspension structure having an existing structure as a basic structure, instead of a structure completely different from the conventional structure, is desirable.

In view of the above-described problem, an object of the present invention is to provide a vehicle rear suspension structure that has a conventional structure as a basic structure and can be applied to a motor-driven 4WD vehicle.

In order to attain the above-described object, a vehicle rear suspension structure according to the present invention includes: a torsion beam extending in a vehicle width direction; and a pair of arm units, one of which is joined to one end of the torsion beam and another of which is joined to another end of the torsion beam, each comprising a trailing arm that has a joining portion with respect to the torsion beam and is formed in a tubular shape extending in a vehicle front-rear direction, and an end plate that occludes a rear side opening of the trailing arm and to which a rear wheel hub is attached. In the vehicle rear suspension structure, a rear arm, which is a portion of the trailing arm on a rear side with respect to the joining portion, is curved such that the rear side opening is opened to an outer side in the vehicle width direction; a hole that is open in such a size that an end portion of a drive shaft connectable to the hub can be inserted thereinto is formed in a portion of the rear arm on an inner side in the vehicle width direction; and each of the units of the pair of arm units comprises an upper reinforcing member that is joined to the rear arm so as to fit at least a part of an upper side edge portion of a peripheral edge portion of the hole, and a lower reinforcing member that is joined to the rear arm so as to fit at least a part of a lower side edge portion of the peripheral edge portion of the hole.

According to the present invention, a vehicle rear suspension structure that has the conventional end plate-type structure as a basic structure and can be applied to a motor-driven 4WD vehicle can be provided.

DETAILED DESCRIPTION

Hereinafter, an embodiment of the present invention will be described with reference to the accompanying drawings.

Figure 1:
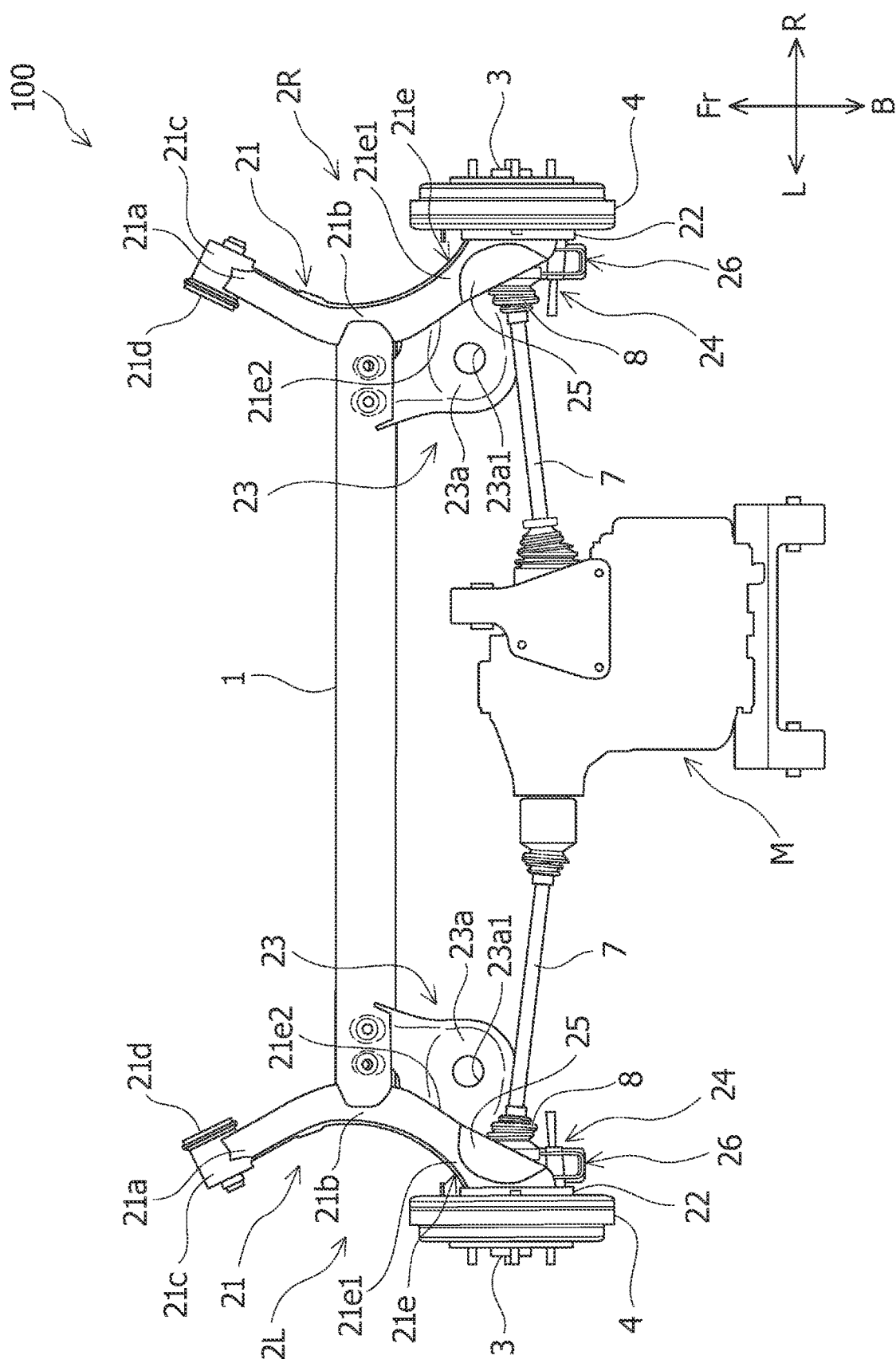
FIG. 1 is a plan view of a vehicle rear suspension structure according to an embodiment of the present invention seen from above.
Figure 2:
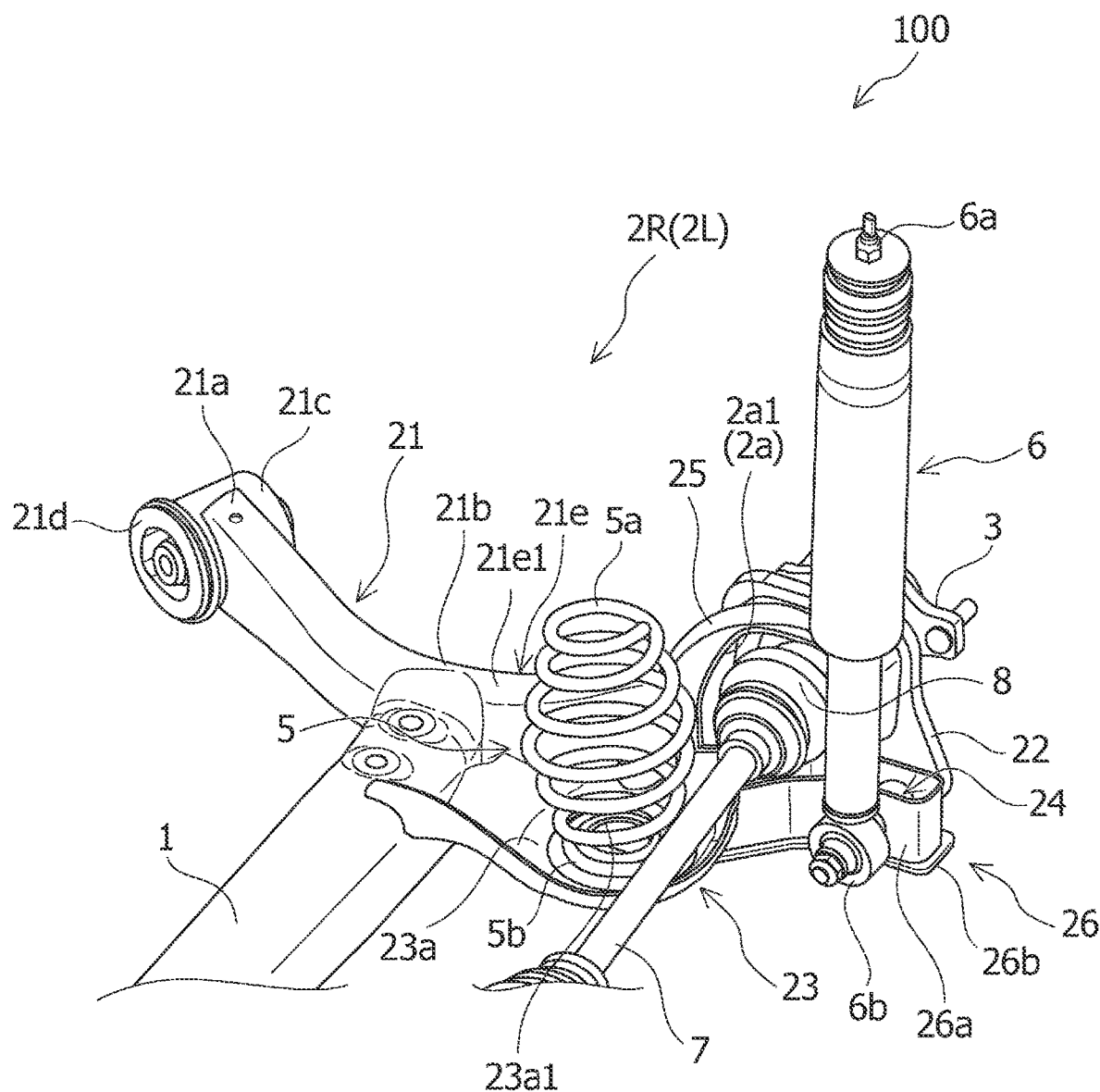
FIG. 2 is a perspective view showing a part of the vehicle rear suspension structure.

FIG. 1 is a plan view of a vehicle rear suspension structure according to an embodiment of the present invention seen from above a vehicle, and FIG. 2 is a perspective view showing a part of the vehicle rear suspension structure of FIG. 1. Note that in the drawing, an arrow Fr indicates the front side in a vehicle front-rear direction and an arrow B indicates the rear side in the vehicle front-rear direction. An arrow R and an arrow L indicate the right and left sides in a vehicle width direction (car width direction) when an occupant faces the front of the vehicle. In addition, an arrow U indicates the upper side in a vehicle up-down direction, and an arrow D indicates the lower side in the vehicle up-down direction. Furthermore, a "front end (front portion)" and a "rear end (rear portion)" in the description of the embodiment correspond to a front end and a rear end in the vehicle front-rear direction.

With reference to FIG. 1 and FIG. 2, a vehicle rear suspension structure 100 according to the present embodiment is a torsion beam type rear suspension structure to which rear wheels are attached. In the present embodiment, the vehicle rear suspension structure 100 is applied to a rear suspension structure in a motor-driven 4WD vehicle (four-wheel drive vehicle).

The vehicle rear suspension structure 100 includes a torsion beam 1 extending in a vehicle width direction and a pair of arm units 2L, 2R.

The torsion beam 1 is a member made of metal that extends linearly in the vehicle width direction and applies a reaction force due to torsion to each of the left and right rear wheels. One of the pair of arm units 2L, 2R is joined to one end of the torsion beam 1, while the other of the pair of arm units 2L, 2R is joined to the other end of the torsion beam 1.

The pair of arm units 2L, 2R are arranged on the one end side and the other end side of the torsion beam 1, with an interval in the vehicle width direction between them. Hereinafter, one of the pair of arm units 2L, 2R is referred to as a left arm unit 2L, while the other of the pair of arm units 2L, 2R is referred to as a right arm unit 2R. The left arm unit 2L is joined to a left end of the torsion beam 1, while the right arm unit 2R is joined to a right end of the torsion beam 1.

In the present embodiment, each of the left arm unit 2L and the right arm unit 2R includes a trailing arm 21, an end plate 22, a spring supporting portion 23, and a shock absorber holding portion 24. Hereinafter, the elements of the right arm unit 2R are mainly described; however, the left arm unit 2L (that is, the one arm unit 2L) and the right arm unit 2R (that is, the other arm unit 2R) have the same structure (shape) except for being formed symmetrically to each other in the vehicle width direction (left-right direction).

The trailing arm 21 includes a front portion 21a connected to a vehicle body and a joining portion 21b with respect to the torsion beam 1, and is formed in a tubular shape extending in the vehicle front-rear direction. Specifically, the trailing arm 21 as a whole is gently curved to be convex to the inner side in the vehicle width direction, to have a bow-like shape which is convex to the inner side in the vehicle width direction.

To the front portion 21a of the trailing arm 21, a vehicle body-side connecting portion 21c made of metal that extends substantially in the vehicle width direction and formed in a cylindrical shape, is joined. To the vehicle body-side connecting portion 21c, a bush 21d made of rubber formed in a cylindrical shape is attached. Into the bush 21d, a pin, illustration of which is omitted herein, supported on the vehicle body side, is inserted. As a result, the trailing arm 21 is connected to the vehicle body in a swingable manner in an up-down direction around the pin as a pivot point.

The joining portion 21b of the trailing arm 21 is positioned substantially at the midpoint of the trailing arm 21 in the longitudinal direction. A portion of the joining portion 21b on the inner side in the vehicle width direction forms a top portion of the curved trailing arm 21, to which the end portion of the torsion beam 1 is joined.

The rear arm 21e, which is a portion of the trailing arm 21 on the rear side with respect to the joining portion 21b, is curved such that the rear side opening of the tubular trailing arm 21 is open to the outer side in the vehicle width direction. In other words, the trailing arm 21 is curved such that the rear side opening of the trailing arm 21 is directed to the outer side in the vehicle width direction.

The end plate 22 is a member that occludes the rear side opening of the trailing arm 21 and to which a rear wheel hub 3 is attached. The end plate 22 is formed of a plate material made of metal having a predetermined thickness, and is joined to an annular end face, which is a peripheral edge portion of the opening of the rear arm 21e of the trailing arm 21. The end plate 22 extends in the vehicle front-rear direction and the vehicle up-down direction, and the peripheral edge portion thereof extends outward from the outer peripheral face of the rear arm 21e.

To a face of the end plate 22 on the outer side in the vehicle width direction, a drum-type brake unit 4 (see FIG. 1) is attached, without particular limitation. The hub 3 is a member that supports the rear wheels in a rotatable manner, and penetrates the brake unit 4 to be attached to the end plate 22. At a center of the end plate 22, a central hole 22a is open (see FIG. 3, FIG. 4, and FIG. 9, as described later), such that the end portion of the hub 3 is exposed to an inner space of the rear arm 21e through the central hole 22a. The shape of the end plate 22 will be described in detail later.

The spring supporting portion 23 is a member for supporting a lower end portion 5b of a coil spring 5 (see FIG. 2) with an upper end portion 5a to be connected to the vehicle body. The spring supporting portion 23 is joined to at least a portion of the rear arm 21e on the inner side in the vehicle width direction. Here, the spring supporting portion 23 is joined also to the torsion beam 1, in addition to the rear arm 21e. Specifically, the spring supporting portion 23 is formed of a thin plate material made of metal, and is has a seat surface portion 23a for receiving the lower end portion 5b of the coil spring 5. In addition, a peripheral edge portion of the seat surface portion 23a of the spring supporting portion 23 is joined to the vicinity of a corner portion formed by the torsion beam 1 and the rear arm 21e.

At a center of the seat surface portion 23a of the spring supporting portion 23, a spring supporting hole 23a1 is opened by, for example, a burring process. In addition, a peripheral edge portion of the spring supporting hole 23a1 in the seat surface portion 23a protrudes upward. By means of the annular peripheral edge portion protruding upward, the lower end portion 5b of the coil spring 5 (see FIG. 2) is supported.

The shock absorber holding portion 24 is a member for holding a lower end portion 6b of a shock absorber 6 (see FIG. 2) with an upper end portion 6a connected to the vehicle body. The shock absorber holding portion 24 is arranged on the inner side in the vehicle width direction with respect to the end plate 22. The shock absorber holding portion 24 is joined to the corresponding arm unit (2L or 2R). The shape and the joining position of the shock absorber holding portion 24 will be described in detail later.

In the vehicle rear suspension structure 100, as described above, the rear side opening of the tubular trailing arm 21 is occluded by the end plate 22, and the hub 3, to which the rear wheels are attached, is attached to the end plate 22. Such a rear suspension structure is employed in many vehicles as a rear suspension structure for front-engine, front-wheel-drive 2WD vehicles (FF vehicles), and is also referred to as the end plate-type structure. Therefore, the vehicle rear suspension structure 100 is constructed on the basis of the end plate-type rear suspension structure applicable to engine-driven 2WD vehicles (FF vehicles), and includes the conventional end plate-type rear suspension structure as a basic structure.

Incidentally, the vehicle to which the vehicle rear suspension structure 100 according to the present embodiment is applied is a motor-driven 4WD vehicle (four-wheel drive vehicle) as described above. The motor-driven 4WD vehicle typically includes an electric motor for front wheel drive and an electric motor for rear wheel drive. With reference to FIG. 1, an electric motor M for rear wheel drive is arranged between the pair of trailing arms 21, 21. Specifically, the electric motor M for rear drive is fixed to the vehicle body on a rear side in the vehicle front-rear direction with respect to the torsion beam 1 and between the two rear arms 21e. Here, the driving force from the electric motor M needs to be transmitted to the rear wheels via the drive shaft 7, the hub 3, and the like. However, the end plate-type rear suspension structure is a structure widely used as a rear suspension structure for an engine-driven FF vehicle in which the driving force does not need to be transmitted to the rear wheels at all. Given this, the vehicle rear suspension structure 100 according to the present embodiment based on the end plate-type structure has the configuration described below in order to transmit the driving force from the electric motor M to the rear wheels.

Figure 3:
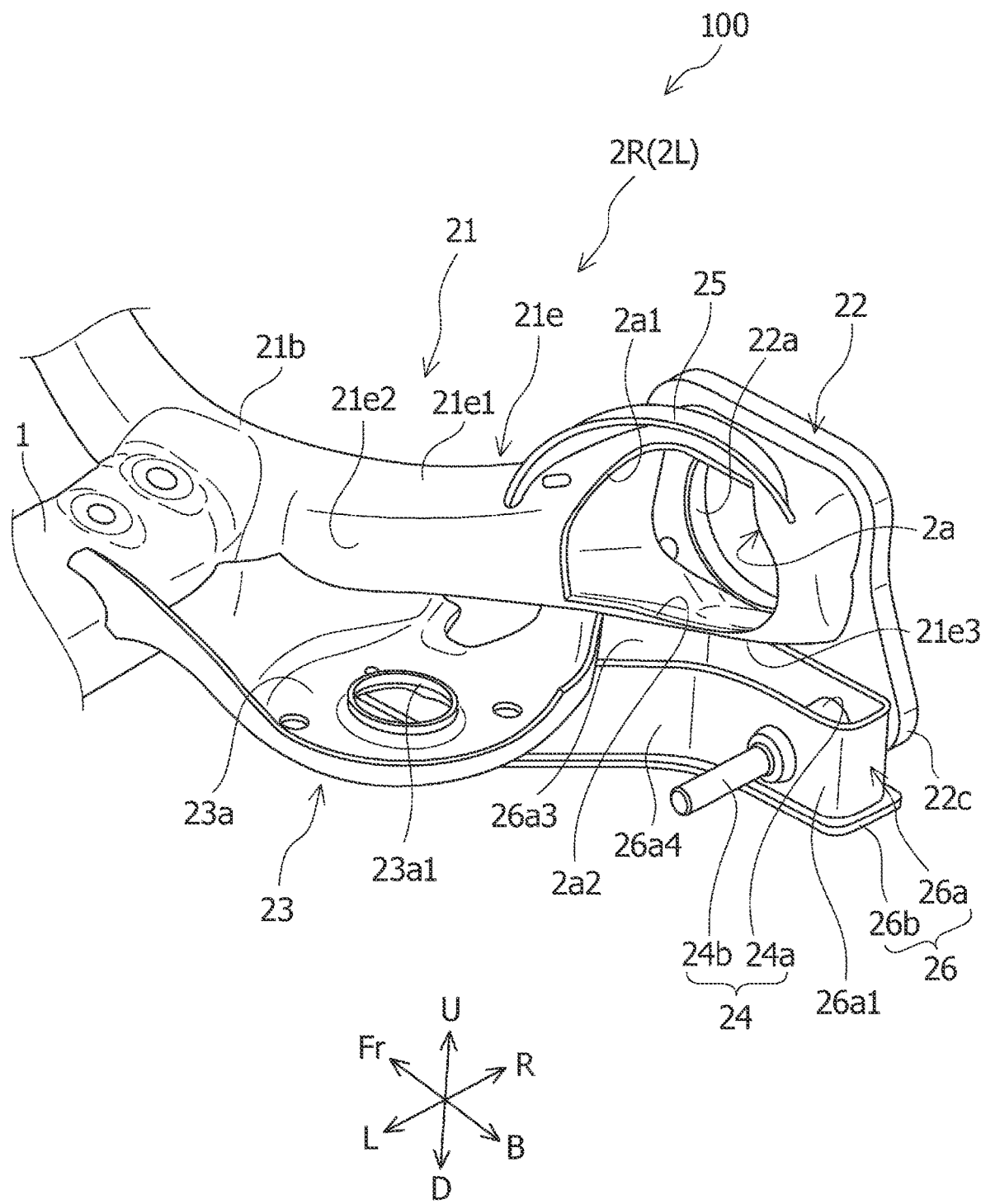
FIG. 3 is an enlarged perspective view of a part of the vehicle rear suspension structure seen from an inner side in a vehicle width direction.
Figure 4:
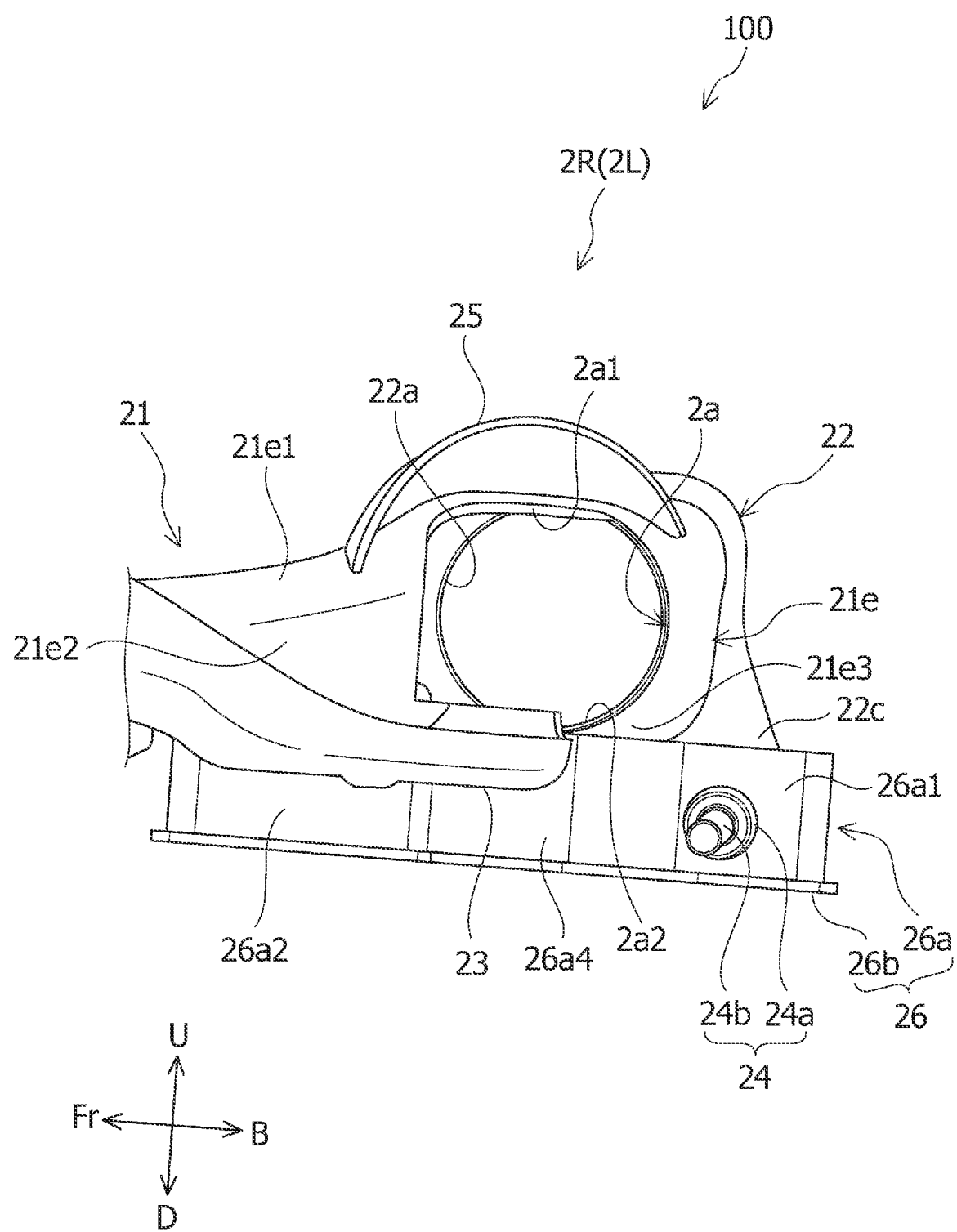
FIG. 4 is a side view of a part of the vehicle rear suspension structure seen from the inner side in the vehicle width direction.
Figure 5:
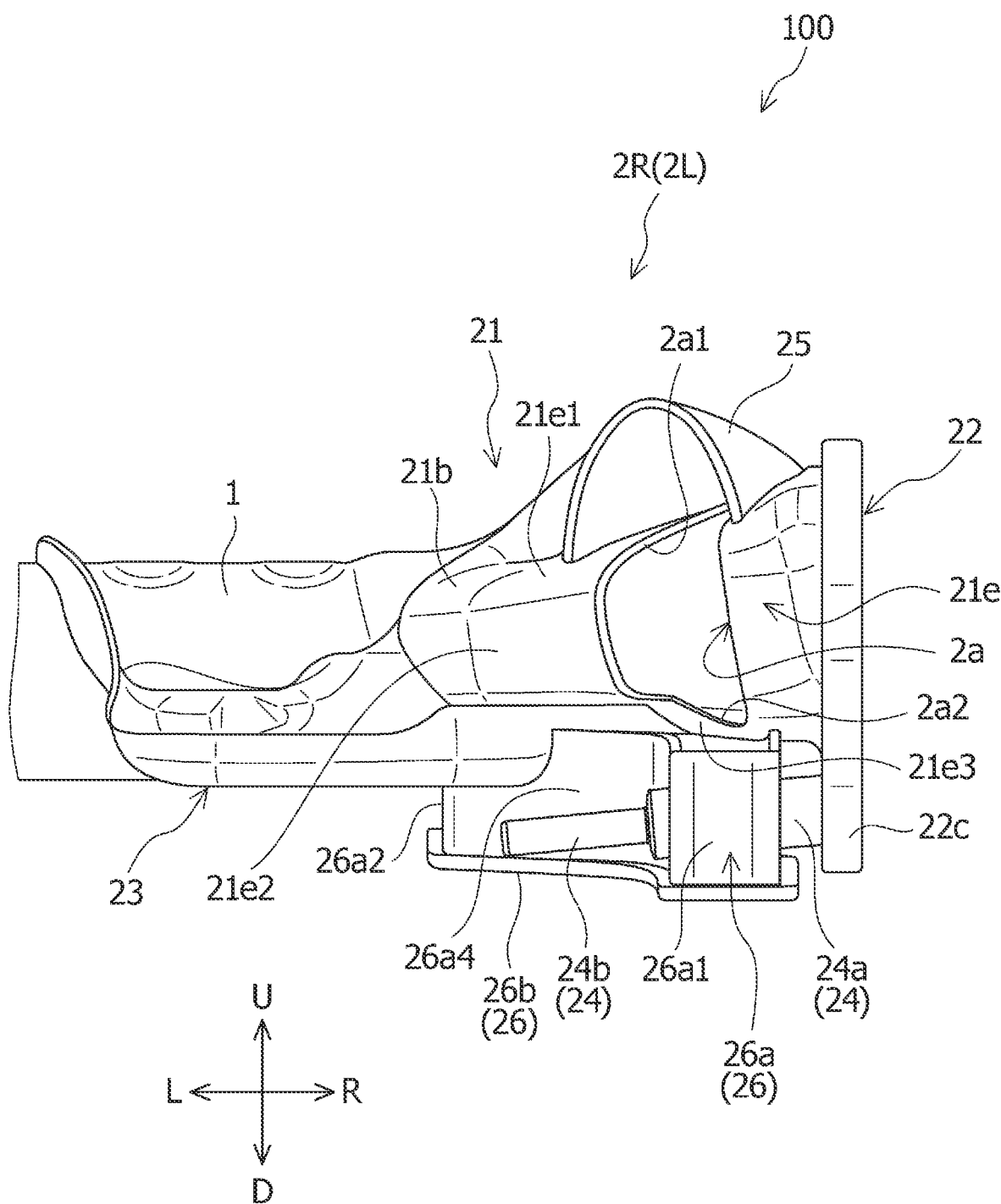
FIG. 5 is a rear view of a part of the vehicle rear suspension structure seen from a rear side.

Next, the configuration of the vehicle rear suspension structure 100 is described in detail. FIG. 3 to FIG. 5 are diagrams illustrating a part (right side portion) of the vehicle rear suspension structure 100, FIG. 3 being an enlarged perspective view seen from an inner side in the vehicle width direction, FIG. 4 being a side view seen from the inner side in the vehicle width direction, and FIG. 5 being a rear view seen from a rear side in the vehicle front-rear direction. FIG. 3 to FIG. 5, and FIG. 6 to FIG. 9, described later, illustrate the state in which the hub 3, the brake unit 4, the coil spring 5 and the shock absorber 6 are removed, and in FIG. 3 to FIG. 6, and FIG. 9, the drive shaft 7 and a boot 8 described later are further removed.

With reference to FIG. 3 to FIG. 5, in the vehicle rear suspension structure 100, a hole 2a (hereinafter referred to as a shaft insertion hole 2a) that is open in such a size that an end portion of the drive shaft 7 connectable to the hub 3 can be inserted thereinto is formed in a portion of the rear arm 21e of the trailing arm 21 on the inner side in the vehicle width direction. Specifically, the electric motor M is connected to the one end portion of the drive shaft 7, while the other end portion of the drive shaft 7 is connected to an end portion of the hub 3 exposed to the inner space of the rear arm 21e. In a portion of the drive shaft 7 in the vicinity of the other end portion, an adjustable joint, not illustrated, covered by the boot 8 made of a hollow rubber member is provided. The boot 8 is formed to be able to accommodate the adjustable joint thereinside, and to have an outer diameter greater than an outer diameter of the drive shaft 7. The shaft insertion hole 2a is open in such a size that the boot 8 can be easily inserted thereinto, and the portion of the boot 8 on the hub 3-side is positioned inside the rear arm 21e. More specifically, the shaft insertion hole 2a is open in such a size that, even in a case in which the trailing arm 21 swings to the maximum, a gap is formed between the outer peripheral face of the boot 8 and the opening edge of the shaft insertion hole 2a.

In the present embodiment, the rear arm 21e of the trailing arm 21 is formed in a tubular shape flattened in the vehicle up-down direction and the vehicle width direction. The rear arm 21e includes, for example, in a portion of the trailing arm 21 on the rear end side, a substantially flat upper face 21e1, a substantially flat inner side face 21e2 on the inner side in the vehicle width direction, and a lower face 21e3 directed downward on the lower side of the inner side face 21e2. The upper face 21e1 is inclined downward substantially to the inner side in the vehicle width direction, the inner side face 21e2 extends substantially in the vehicle up-down direction, and the lower face 21e3 is gently curved to continue to the inner side face 21e2 (or is inclined upward substantially to the inner side in the vehicle width direction).

In the present embodiment, the shaft insertion hole (that is, boot insertion hole) 2a is open from the portion of the rear arm 21e on the inner side in the vehicle width direction to a region on the substantially flat upper face 21e1 of the rear arm 21e. In addition, in the present embodiment, the shaft insertion hole 2a further reaches the lower face 21e3 of the rear arm 21e. Consequently, the shaft insertion hole 2a is open on the upper face 21e1, the inner side face 21e2, and the lower face 21e3 of the rear arm 21e that has a vertically and horizontally flat tubular shape. In other words, an upper side portion of the opening edge of the shaft insertion hole 2a is positioned in a region on the substantially flat upper face 21e1 of the rear arm 21e, and a lower side portion of the opening edge of the shaft insertion hole 2a is positioned in a region on the lower face 21e3 of the rear arm 21e. As such, the shaft insertion hole 2a is formed as an opening extending in the up-down direction with respect to the inner side face 21e2 of the rear arm 21e.

In addition, each of the left arm unit 2L and the right arm unit 2R further includes an upper reinforcing member 25 and a lower reinforcing member 26. The upper reinforcing member 25 and the lower reinforcing member 26 are members for compensating a reduction in arm stiffness due to opening of the large shaft insertion hole 2a.

The upper reinforcing member 25 is a reinforcing member joined to the rear arm 21e so as to fit at least a part of an upper side edge portion 2a1 of the peripheral edge portion of the shaft insertion hole 2a. The upper reinforcing member 25 is formed of a plate material made of metal and extends substantially in the vehicle front-rear direction.

The lower reinforcing member 26 is a reinforcing member joined to the rear arm 21e so as to fit at least a part of a lower side edge portion 2a2 of the peripheral edge portion of the shaft insertion hole 2a. The lower reinforcing member 26 is formed of a plate material made of metal and extends substantially in the vehicle front-rear direction.

In the present embodiment, front ends of the upper reinforcing member 25 and the lower reinforcing member 26 are positioned on a front side with respect to the shaft insertion hole 2a, whereas rear ends of the upper reinforcing member 25 and the lower reinforcing member 26 are positioned on a rear side with respect to the shaft insertion hole 2a. Consequently, lengths of the upper reinforcing member 25 and the lower reinforcing member 26 in the vehicle front-rear direction are greater than the opening width of the shaft insertion hole 2a in the vehicle front-rear direction. In addition, the upper reinforcing member 25 is joined to the rear arm 21e so as to be across the shaft insertion hole 2a in the vehicle front-rear direction and to fit the upper side edge portion 2a1 of the shaft insertion hole 2a. The lower reinforcing member 26 is joined to the rear arm 21e so as to be across the shaft insertion hole 2a in the vehicle front-rear direction and to fit the lower side edge portion 2a2.

Figure 6:
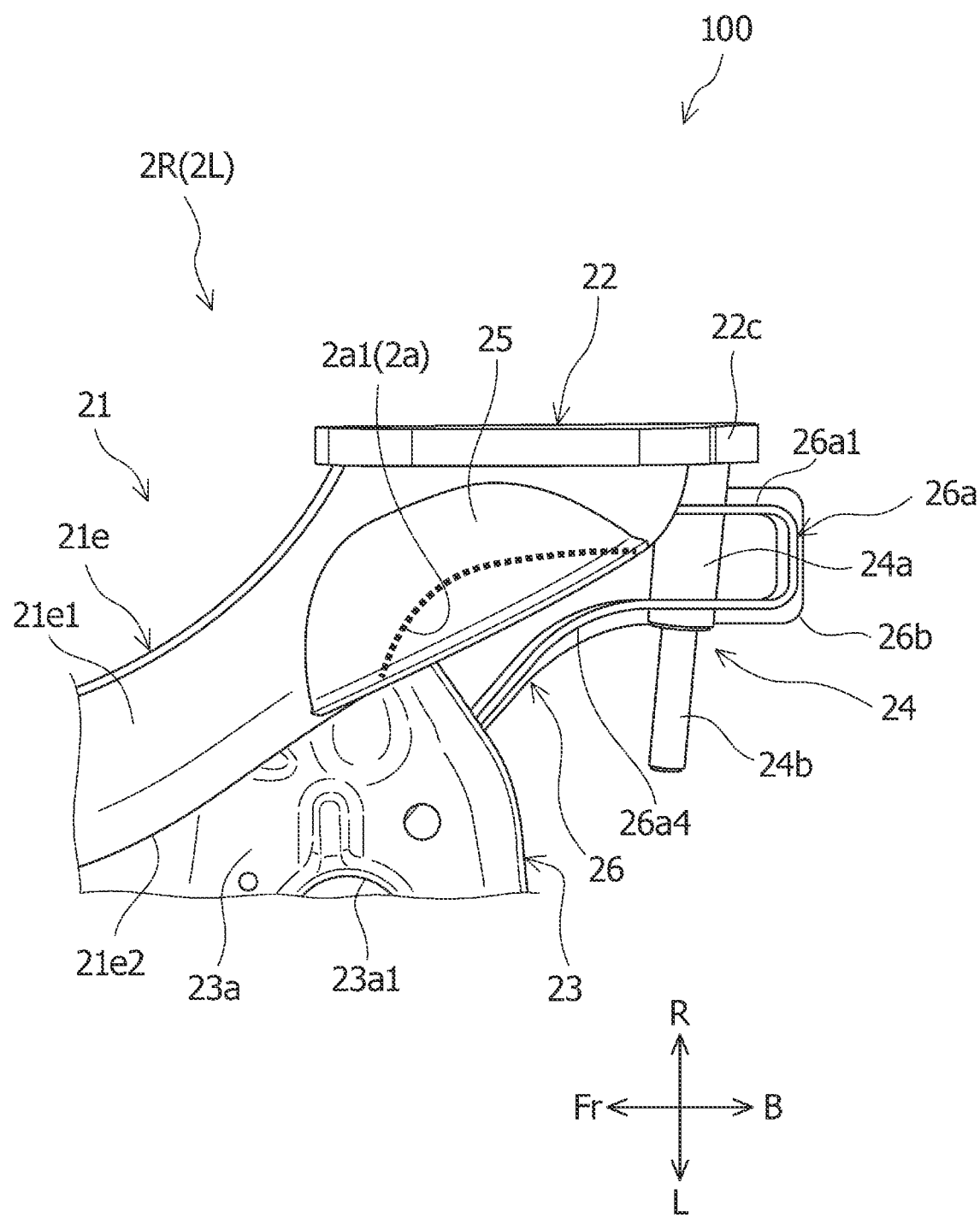
FIG. 6 is a plan view of a part of the vehicle rear suspension structure seen from above.

FIG. 6 is a plan view of a part of the vehicle rear suspension structure 100 of FIG. 3 seen from above. With reference to FIG. 3 to FIG. 6, in the present embodiment, the upper reinforcing member 25 is joined to the upper face 21e1 of the rear arm 21e, and is formed to bulge upward from the upper face 21e1 and to cover from above the opening region inside the upper side edge portion 2a1 of the peripheral edge portion of the shaft insertion hole 2a in a top view (see FIG. 6). Specifically, the upper reinforcing member 25 is formed in a half-dome shape open to the lower side in the vehicle up-down direction and to the inner side in the vehicle width direction and has a half hemisphere face (face of a half of a hemisphere face). A lower edge of the upper reinforcing member 25 extends in an arc-like shape in a top view and forms a joining edge portion with respect to the rear arm 21e.

Figure 7:
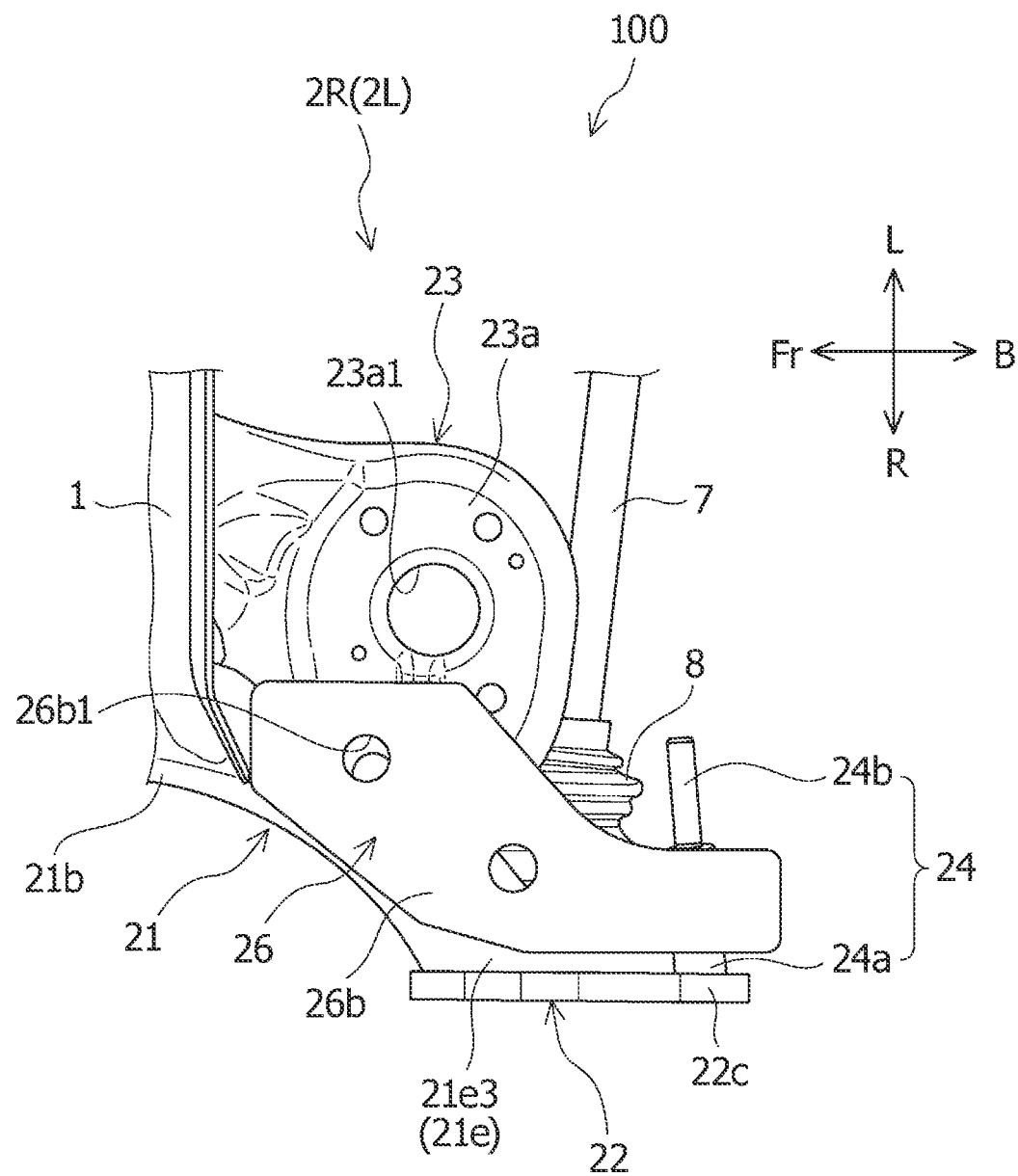
FIG. 7 is a bottom view of a part of the vehicle rear suspension structure seen from below.
Figure 8:
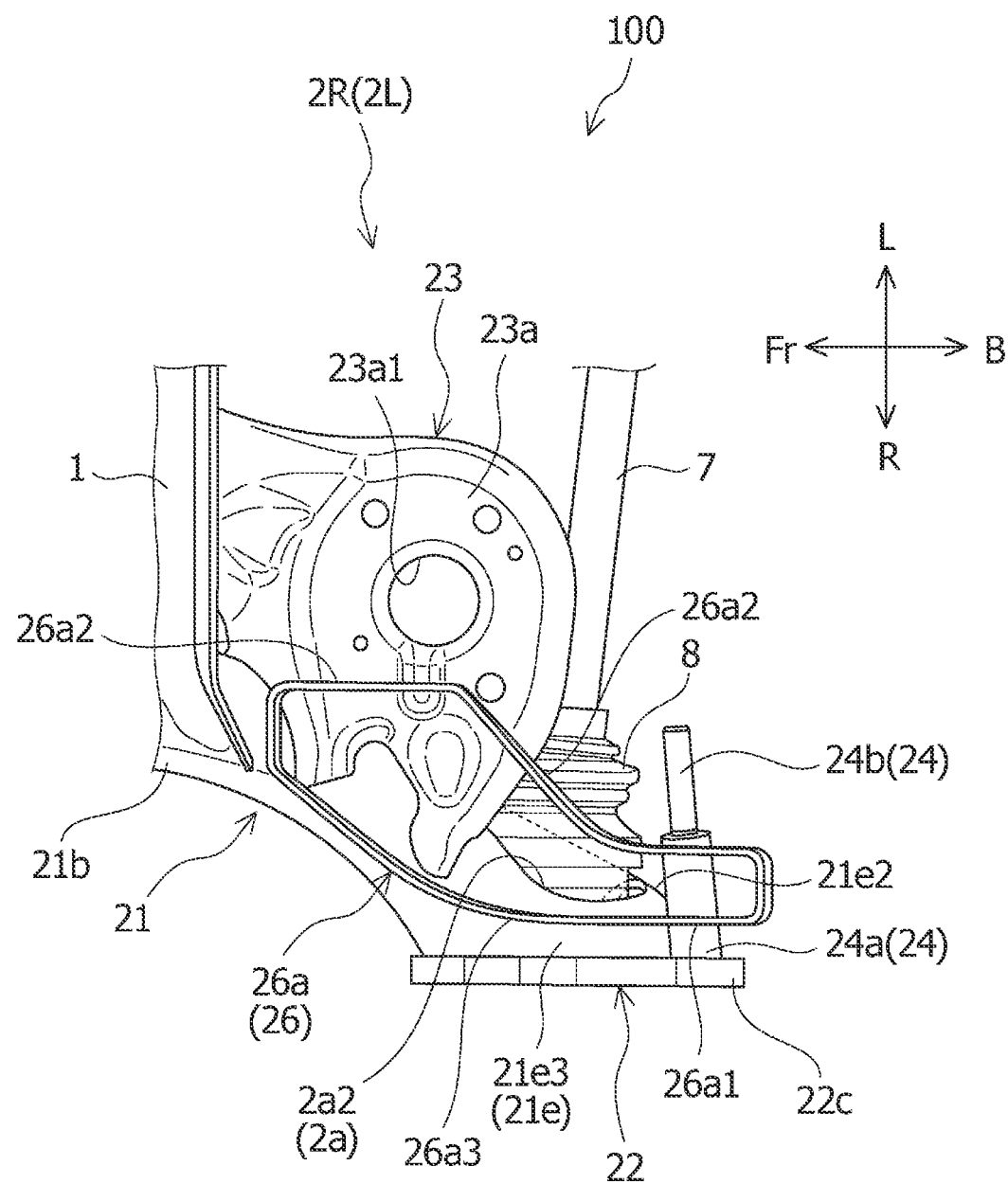
FIG. 8 is a diagram illustrating a state in which a lower reinforcing member is removed from the bottom view of FIG. 7.

FIG. 7 is a bottom view of a part of the vehicle rear suspension structure 100 of FIG. 3 seen from below, and FIG. 8 is a diagram illustrating a state in which a lower face member is removed from the bottom view of FIG. 7. With reference to FIG. 3 to FIG. 8, in the present embodiment, the lower reinforcing member 26 includes a vertical tube portion 26a and a bottom plate portion 26b. The lower reinforcing member 26, as a whole, extends in the vehicle front-rear direction from a predetermined position on a front side with respect to the spring supporting portion 23 to a predetermined position on a rear side with respect to the rear end (specifically, the rear end of the end plate 22) of the trailing arm 21.

The vertical tube portion 26a is formed in a tubular shape extending in the vehicle up-down direction, and has an annular upper end face joined to the rear arm 21e of the trailing arm 21 and the lower face of the spring supporting portion 23. Specifically, the vertical tube portion 26a is formed of a plate material made of metal, to be flat in the vehicle width direction. Most of a portion of the upper end face of the vertical tube portion 26a on the outer side in the vehicle width direction is joined to a portion of the lower face 21e3 of the rear arm 21e on the lower side with respect to the shaft insertion hole 2a, whereas most of a front half of a portion of the upper end face of the vertical tube portion 26a on the inner side in the vehicle width direction is joined to a lower face of the seat surface portion 23a of the spring supporting portion 23.

More specifically, the vertical tube portion 26a is composed of a U-shaped portion 26a1, an L-shaped portion 26a2, an outer curved portion 26a3 that connects one end of the U-shaped portion 26a1 and one end of the L-shaped portion 26a2, and an inner curved portion 26a4 that connects the other end of the U-shaped portion 26a1 and the other end of the L-shaped portion 26a2. The U-shaped portion 26a1 constitutes a rear portion of the vertical tube portion 26a, and is positioned in the vicinity of the end plate 22. The L-shaped portion 26a2 constitutes a front portion of the vertical tube portion 26a, and is positioned on the inner side in the vehicle width direction with respect to the U-shaped portion 26a1. The outer curved portion 26a3 fits the lower face 21e3 of the trailing arm 21 and is curved with respect to the vehicle width direction. The inner curved portion 26a4 has a portion fitting the lower face of the seat surface portion 23a of the spring supporting portion 23 and is curved with respect to the vehicle width direction on the inner side of the outer curved portion 26a3. A portion of the annular upper end face of the vertical tube portion 26a corresponding to the outer curved portion 26a3 is joined mainly to the rear arm 21e of the trailing arm 21, whereas a portion of the annular upper end face of the vertical tube portion 26a corresponding to most of the part of the L-shaped portion 26a2 and a part of the inner curved portion 26a4 is joined to the lower face of the spring supporting portion 23. Note that, the lower face of the spring supporting portion 23 is positioned on the lower side with respect to the lower face 21e3 of the rear arm 21e, and a portion of the vertical tube portion 26a on the lower side of the spring supporting portion 23 is cut out downward in a shape corresponding to the position of the lower face of the spring supporting portion 23. A bottom portion of the U-shape of the U-shaped portion 26a1 is positioned on a rear side with respect to the rear end of the end plate 22, whereas a portion of the L-shaped portion 26a2 extending to the outer side in the vehicle width direction is positioned on a front side with respect to the seat surface portion 23a of the spring supporting portion 23.

The bottom plate portion 26b is formed of a plate material made of metal, and is joined to the annular lower end face of the vertical tube portion 26a so as to occlude the opening on the lower side of the vertical tube portion 26a. In addition, the peripheral edge portion of the bottom plate portion 26b extends outward from the outer peripheral face of the vertical tube portion 26a. The bottom plate portion 26b has a plurality (two in the drawings) of drain holes 26b1. In a case in which a liquid such as rainwater enters the inside of the lower reinforcing member 26, the liquid is discharged through the drain holes 26b1.

To the lower reinforcing member 26, the shock absorber holding portion 24 described above is joined. The shock absorber holding portion 24 is further joined to the end plate 22. In other words, in the present embodiment, the shock absorber holding portion 24 is joined to the lower reinforcing member 26 and the end plate 22.

Specifically, the shock absorber holding portion 24 is formed in a rod-like shape extending in the vehicle width direction to penetrate the rear portion (U-shaped portion 26a1) of the vertical tube portion 26a of the lower reinforcing member 26. The shock absorber holding portion 24 is formed in a stepped rod-like shape composed of a larger-diameter portion 24a joined to the lower reinforcing member 26 and the end plate 22, and a smaller-diameter portion 24b holding the lower end portion 6b of the shock absorber 6 (see FIG. 2). The shock absorber holding portion 24 and the spring supporting portion 23 are spaced apart from each other in the vehicle front-rear direction, and arranged such that the drive shaft 7 extends in the vehicle width direction in a region between the coil spring 5 and the shock absorber 6.

The larger-diameter portion 24a penetrates the vertical tube portion 26a (U-shaped portion 26a1) and is joined to the vertical tube portion 26a (U-shaped portion 26a1). In other words, an end portion of the larger-diameter portion 24a on the inner side in the vehicle width direction protrudes to the inner side in the vehicle width direction from the vertical tube portion 26a, while an end portion of the larger-diameter portion 24a on the outer side in the vehicle width direction protrudes to the outer side in the vehicle width direction from the vertical tube portion 26a. The larger-diameter portion 24a is joined to the U-shaped portion 26a1 of the vertical tube portion 26a at two positions: a wall on the inner side in the vehicle width direction; and a wall on the outer side in the vehicle width direction.

The smaller-diameter portion 24b has an outer diameter smaller than the outer diameter of the larger-diameter portion 24a, and extends to protrude to the inner side in the vehicle width direction from the end portion of the larger-diameter portion 24a on the inner side in the vehicle width direction. The lower end portion 6b of the shock absorber 6 (see FIG. 2) is held by the smaller-diameter portion 24b.

Figure 9:
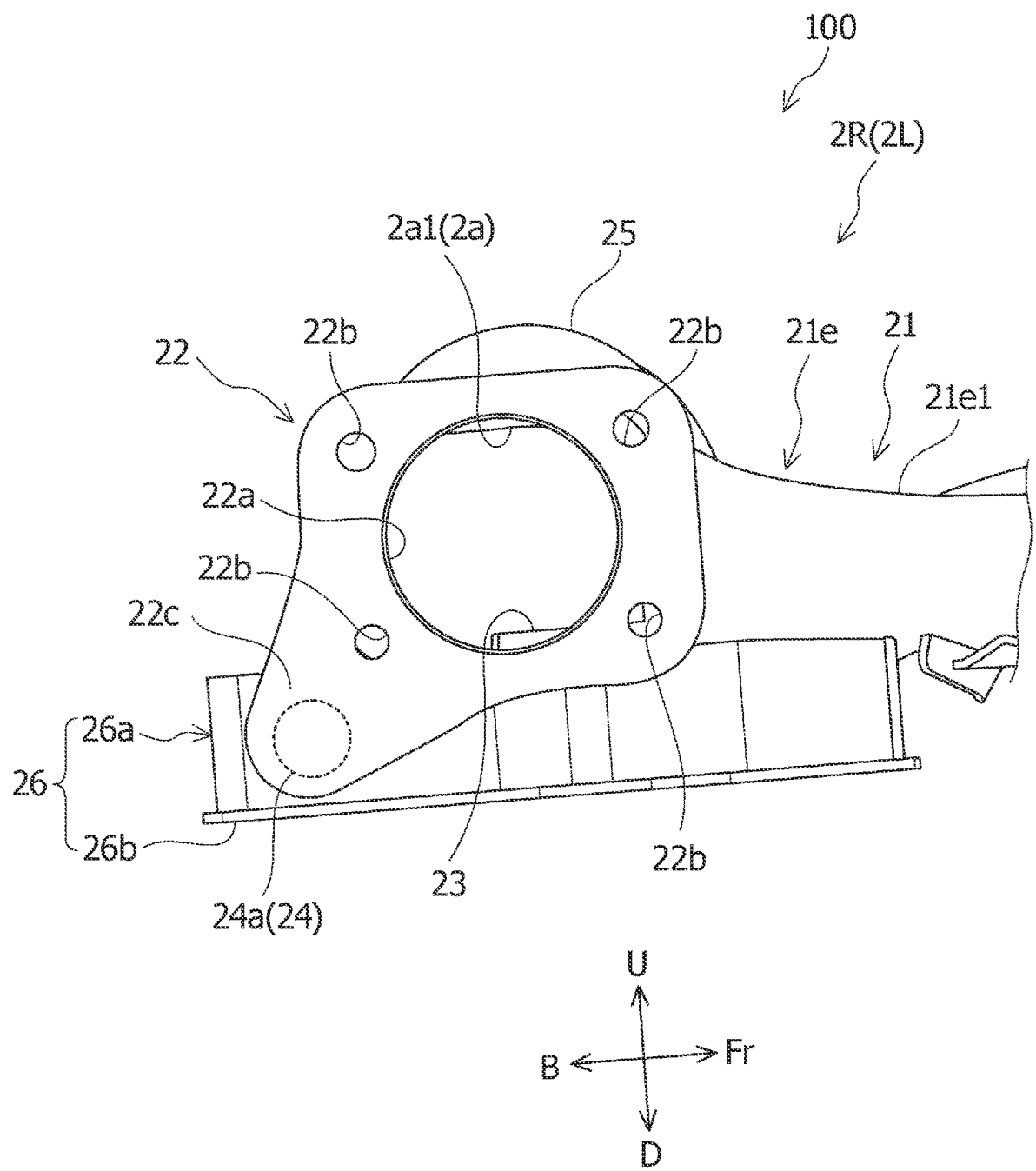
FIG. 9 is a side view of a part of the vehicle rear suspension structure seen from an outer side in the vehicle width direction.

FIG. 9 is a side view of a part of the vehicle rear suspension structure 100 of FIG. 3 seen from an outer side in the vehicle width direction. With reference to FIG. 5 to FIG. 9, in the present embodiment, the end portion of the larger-diameter portion 24a of the shock absorber holding portion 24 on the outer side in the vehicle width direction is joined to an inner side face of the end plate 22. Specifically, with reference to FIG. 9, the end plate 22 is formed in a substantially rectangular shape. The central hole 22a that is open on the end plate 22 is formed as a round hole. Seen from the vehicle width direction (see FIG. 4 and FIG. 9), an opening region of the central hole 22a and an opening region of the shaft insertion hole 2a substantially overlap each other. In addition, a bolt insertion hole 22b is open in each of four corners of the end plate 22. Into the bolt insertion hole 22b, a bolt for mounting the brake unit 4 to the end plate 22 is inserted. In addition, in a corner portion on a lower rear side of the end plate 22, an extended portion 22c, which is extended to protrude obliquely, is provided. The extended portion 22c extends in the vehicle up-down direction to the vicinity of the bottom plate portion 26b of the lower reinforcing member 26, and the U-shaped portion 26a1 of the vertical tube portion 26a of the lower reinforcing member 26 is positioned on the inner side in the vehicle width direction of the extended portion 22c. The wall on the outer side in the vehicle width direction of the U-shaped portion 26a1 of the vertical tube portion 26a and the extended portion 22c are close to and face each other in the vehicle width direction. In addition, the end portion of the larger-diameter portion 24a of the shock absorber holding portion 24 on the outer side in the vehicle width direction is joined to the inner side face of the extended portion 22c of the end plate 22.

Next, an action of the vehicle rear suspension structure 100 according to the present embodiment will be described.

As described above, the vehicle rear suspension structure 100 includes, as a basic structure, the conventional end plate-type rear suspension structure widely used as a rear suspension structure for engine-driven 2WD vehicles (FF vehicles), and is constructed on the basis of this structure. Consequently, the rear suspension structure for the rear wheels of a 4WD vehicle is thus constructed at low cost. In the vehicle rear suspension structure 100, the shaft insertion hole 2a that is open in such a size that the end portion of the drive shaft 7 connectable to the hub 3 can be inserted thereinto is formed in a portion of the rear arm 21e of the trailing arm 21 on the inner side in the vehicle width direction, and a reduction in arm stiffness due to opening of the large shaft insertion hole 2a on the trailing arm 21 is reinforced by the upper reinforcing member 25 and the lower reinforcing member 26. Consequently, the vehicle rear suspension structure 100 has a sufficient arm stiffness despite the large shaft insertion hole 2a being open on the trailing arm 21, and has a structure enabling transmission of the driving force from the electric motor M to the rear wheels by connecting the drive shaft 7 to the hub 3 attached to the end plate 22 through the shaft insertion hole 2a.

As described above, the vehicle rear suspension structure 100 according to the present embodiment is a vehicle rear suspension structure that includes the conventional end plate-type rear suspension structure as a basic structure, and is applicable to motor-driven 4WD vehicles. Note that, the vehicle rear suspension structure 100 is applicable to, not only the motor-driven 4WD vehicles, but to any of: a rear suspension structure of 2WD vehicles (RR vehicles) in which the electric motor M arranged on a rear side of the vehicle drives only the rear wheels; a rear suspension structure of 2WD vehicles (FF vehicles) in which the electric motor arranged on a front side of the vehicle drives only the front wheels; and a rear suspension structure of 2WD vehicles (FF vehicles) in which an engine driven by internal combustion arranged on a front side of the vehicle drives only the front wheels. In other words, the vehicle rear suspension structure 100 may also be used for 2WD vehicles and 4WD vehicles, thus having high versatility.

In the present embodiment, the front ends of the upper reinforcing member 25 and the lower reinforcing member 26 are positioned on the front side with respect to the shaft insertion hole 2a, whereas the rear ends of the upper reinforcing member 25 and the lower reinforcing member 26 are positioned on the rear side with respect to the shaft insertion hole 2a. As a result, the upper side edge portion 2a1 of the peripheral edge portion of the shaft insertion hole 2a is reinforced by the upper reinforcing member 25 over the entirety in the vehicle front-rear direction, and the lower side edge portion 2a2 of the peripheral edge portion of the shaft insertion hole 2a is reinforced by the lower reinforcing member 26 over the entirety in the vehicle front-rear direction, whereby the trailing arm 21 is reinforced more effectively.

In the present embodiment, the upper reinforcing member 25 is joined to the upper face 21e1 of the rear arm 21e, and is formed to bulge upward from the upper face 21e1 and to cover from above the opening region inside the upper side edge portion 2a1 in a top view. As a result, the upper reinforcing member 25 formed in a compact manner and having sufficient reinforcement strength is constructed, and a structure is constructed in which interference between the boot 8 and the trailing arm 21 during swing of the trailing arm 21 can be easily prevented.

In the present embodiment, the lower reinforcing member 26 has the vertical tube portion 26a formed in a tubular shape extending in the vehicle up-down direction, and having the annular upper end face joined to the rear arm 21e and the lower face of the spring supporting portion 23. As a result, the trailing arm 21 is reinforced more effectively by a large joined body of the spring supporting portion 23 and the lower reinforcing member 26 having the vertical tube portion 26a. In addition, an increase in the supporting stiffness by the coil spring 5 is also enabled.

In the present embodiment, the shock absorber holding portion 24 is joined to the lower reinforcing member 26 and the end plate 22. As a result, the shock absorber holding portion 24 is strongly supported by a large joined body of the lower reinforcing member 26 and the end plate 22, without a dedicated member being added for ensuring stiffness for supporting the shock absorber holding portion 24 itself. In addition, the load from the shock absorber 6 is input in a dispersed manner over the entirety of the trailing arm 21 via the shock absorber holding portion 24, the lower reinforcing member 26, and the end plate 22, whereby the shock absorber 6 is stably supported by the trailing arm 21. From the viewpoint of the stiffness in the vehicle up-down direction allowing resistance against the input load from the coil spring 5 and the shock absorber 6, it is preferred that the lower reinforcing member 26 include the vertical tube portion 26a.

The description of this embodiment is an example for describing the present invention, and does not limit the present invention as claimed in the claims. The configuration of each component of the present invention is not limited to that in the embodiment described above, and it can be variously changed in technical scope as claimed in the claims.

For example, the extended portion 22c of the end plate 22 is spaced apart from the bottom plate portion 26b of the lower reinforcing member 26, but it is not limited thereto and may be in contact with, and joined to, the bottom plate portion 26b. The spring supporting portion 23 is joined to the torsion beam 1, but it is not limited thereto and is not required to be joined to the torsion beam 1. The shock absorber holding portion 24 is formed in a rod-like shape, but it is not limited thereto and may also be a bracket obtained by bending a plate made of metal. In addition, the brake unit 4 may also be a disc-type unit.

The upper reinforcing member 25 is formed in a half-dome shape, but it is not limited thereto and is only required to be formed to fit at least a part of the upper side edge portion 2a1 of the peripheral edge portion of the shaft insertion hole 2a. In addition, the lower reinforcing member 26 is not required to have the bottom plate portion 26b. The lower reinforcing member 26 is not limited to a shape with the vertical tube portion 26a. The lower reinforcing member 26 is only required to be formed to fit at least a part of the lower side edge portion 2a2 of the peripheral edge portion of the shaft insertion hole 2a.

What is claimed is:

1. A vehicle rear suspension structure comprising:
   a torsion beam extending in a vehicle width direction; and
   a pair of arm units, one of which is joined to one end of the torsion beam and another of which is joined to another end of the torsion beam, each comprising a trailing arm that has a joining portion with respect to the torsion beam and is formed in a tubular shape extending in a vehicle front-rear direction, and an end plate that occludes a rear side opening of the trailing arm and to which a rear wheel hub is attached,
   wherein:
   a rear arm, which is a portion of the trailing arm on a rear side with respect to the joining portion, is curved such that the rear side opening is opened to an outer side in the vehicle width direction;
   a hole that is open in such a size that an end portion of a drive shaft connectable to the hub can be inserted thereinto is formed in a portion of the rear arm on an inner side in the vehicle width direction; and
   each of the units of the pair of arm units comprises an upper reinforcing member that is joined to the rear arm so as to fit at least a part of an upper side edge portion of a peripheral edge portion of the hole, and a lower reinforcing member that is joined to the rear arm so as to fit at least a part of a lower side edge portion of the peripheral edge portion of the hole.

2. The vehicle rear suspension structure according to claim 1, wherein:
   a front end of the upper reinforcing member and a front end of the lower reinforcing member are positioned on a front side with respect to the hole; and
   a rear end of the upper reinforcing member and a rear end of the lower reinforcing member are positioned on a rear side with respect to the hole.

3. The vehicle rear suspension structure according to claim 1, wherein:
   the rear arm is formed in a tubular shape flattened in a vehicle up-down direction and the vehicle width direction;
   the hole is open from a portion of the rear arm on the inner side in the vehicle width direction to a region on an upper face of the rear arm; and
   the upper reinforcing member is joined to the upper face of the rear arm, and is formed to bulge upward from the upper face and to cover from above an opening region on an inner side of the upper side edge portion in a top view.

4. The vehicle rear suspension structure according to claim 1, wherein:
   each of the units of the pair of arm units comprises a spring supporting portion that supports a lower end portion of a coil spring and is joined to at least a portion on the inner side in the vehicle width direction of the rear arm; and
   the lower reinforcing member comprises a vertical tube portion that is formed in a tubular shape extending in the vehicle up-down direction and has an annular upper end face joined to the rear arm and a lower face of the spring supporting portion.

5. The vehicle rear suspension structure according to claim 1, wherein:
   each of the units of the pair of arm units comprises a shock absorber holding portion that holds a lower end portion of a shock absorber and is joined to the lower reinforcing member and the end plate.

* * * * *